United States Patent [19]

Jambor et al.

[11] Patent Number: 5,236,219
[45] Date of Patent: Aug. 17, 1993

[54] VERTICALLY ADJUSTABLE ROLL BAR FOR A MOTOR VEHICLE

[75] Inventors: Arno Jambor, Vaihingen/Enz; Peter Seifert, Weil der Stadt; Alexander Klatt, München, all of Fed. Rep. of Germany

[73] Assignee: Mercedes-Benz AG, Fed. Rep. of Germany

[21] Appl. No.: 819,328

[22] Filed: Jan. 10, 1992

[30] Foreign Application Priority Data

Jan. 10, 1991 [DE] Fed. Rep. of Germany ....... 4100506

[51] Int. Cl.⁵ .............................................. B60R 21/13
[52] U.S. Cl. ................................................. 280/756
[58] Field of Search ............................... 280/756, 753; 296/180.5, 153, 99.1

[56] References Cited

U.S. PATENT DOCUMENTS

| | | | |
|---|---|---|---|
| 3,036,858 | 5/1962 | Fingerut | 280/756 |
| 3,298,731 | 1/1967 | Sangimino | 296/99.1 |
| 3,762,761 | 10/1973 | Erickson | 280/756 |
| 4,781,260 | 11/1988 | Morita et al. | 280/756 |
| 5,129,676 | 7/1992 | Sheehan | 280/756 |

FOREIGN PATENT DOCUMENTS

| | | |
|---|---|---|
| 459213 | 12/1991 | European Pat. Off. . |
| 1555955 | 10/1970 | Fed. Rep. of Germany . |
| 3723378 | 1/1989 | Fed. Rep. of Germany . |
| 3822461 | 1/1990 | Fed. Rep. of Germany . |
| 3925515 | 1/1991 | Fed. Rep. of Germany . |
| 3930171 | 3/1991 | Fed. Rep. of Germany . |
| 640499 | 7/1928 | France ............................ 280/756 |
| 94756 | 8/1960 | Norway .......................... 280/756 |

*Primary Examiner*—Karin L. Tyson
*Attorney, Agent, or Firm*—Evenson, McKeown, Edwards & Lenahan

[57] ABSTRACT

A vertically adjustable roll bar for a motor vehicle is disclosed which has side arms displaceable within holding tubes rising vertically parallel to the vehicle sides. The holding tubes are connected to one another by a connecting element on the tube stems extending in the direction of the vehicle width. The holding tubes are supplemented by another transverse-running connecting element to form a rigid guide frame, which is rectangularly closed in the transverse direction of the vehicle.

7 Claims, 2 Drawing Sheets

VERTICALLY ADJUSTABLE ROLL BAR FOR A MOTOR VEHICLE

BACKGROUND AND SUMMARY OF THE INVENTION

The invention relates to a vertically adjustable roll bar for a motor vehicle.

From German Patent Document 1 555 955, a roll bar for a motor vehicle is known, the side arms of which are displaceably guided within two holding tubes supported on the frame of a vehicle bottom. These two holding tubes are connected to one another close to the vehicle bottom by a connecting rod extending across the vehicle width, which connecting rod is configured as a cross-strut for the holding tubes. In addition, support rods are also provided, which are mounted crosswise, having the upper ends pivotably mounted on the roll bar and having the lower ends slidingly guided on the connecting rod. When the roll bar is fully extended, these support rods engage into notches in the connecting rod and are intended additionally to strengthen the roll bar against lateral loads.

Vehicles which are fitted with a roll bar are generally designed without a fixed roof. Since there is therefore no element present to stabilize the body, the bottom of the vehicle is increasingly susceptible, when mounting a curb for example, to distortions. Consequently, even the holding tubes for the roll bar can be forced at their free end out of their original direction of extension and, above all, out of their parallel arrangement, as a result of which an extending movement of the roll bar is no longer possible at all or is only possible against a high resistance within the runners of the holding tubes. The support rods are only able, by locking, to provide a force to counteract this movement of the receiving tubes, if the roll bar is extended.

An object of the invention is to facilitate the fitting of an anti-roll device into a motor vehicle and to enable fitting at a later time.

This object is achieved by providing an arrangement wherein the holding tubes are supplemented by another transverse-running connecting element to form a rigid guide frame, which rigid guide frame is rectangularly closed in the transverse direction of the vehicle, and wherein a thrust element and a locking mechanism for the roll bar is secured to the guide frame in the form of an assembly unit, and wherein this guide frame exhibits connecting parts by which it can be connected to a vehicle body.

The holding tubes for the arms of the roll bar are supplemented by two connecting elements to form a rigid guide frame which is rectangularly closed. This rigid guide frame is unyielding even if a distortion of the vehicle bottom should occur and does not allow the holding tubes out of their position in which they are aligned with one another and with the arms of the roll bar. Consequently, a displacement of the roll bar within the holding tubes is possible at any time.

The rigid guide frame can, as a result of its rectangular form, be at least partially configured to have covering side walls in a cassette-like form, under which side walls a thrust element and a locking mechanism for the roll bar shall then likewise be disposed. This combination of the required elements is favorably fitted together in advance and secured within the vehicle as a complete modular unit. As a result, the subsequent fitting of a roll bar into a vehicle is also made simpler.

A simple mounting of the guide frame is assured by bolting the guide frame to the body, the guide frame being able to be secured with limited flexibility at its fastening points, for example via a rubber mounting in order that any distortion of the bottom will not overload the fastenings of the guide frame.

Other objects, advantages and novel features of the present invention will become apparent from the following detailed description of the invention when considered in conjunction with the accompanying drawings.

DETAILED DESCRIPTION OF THE DRAWINGS

Figure 1:
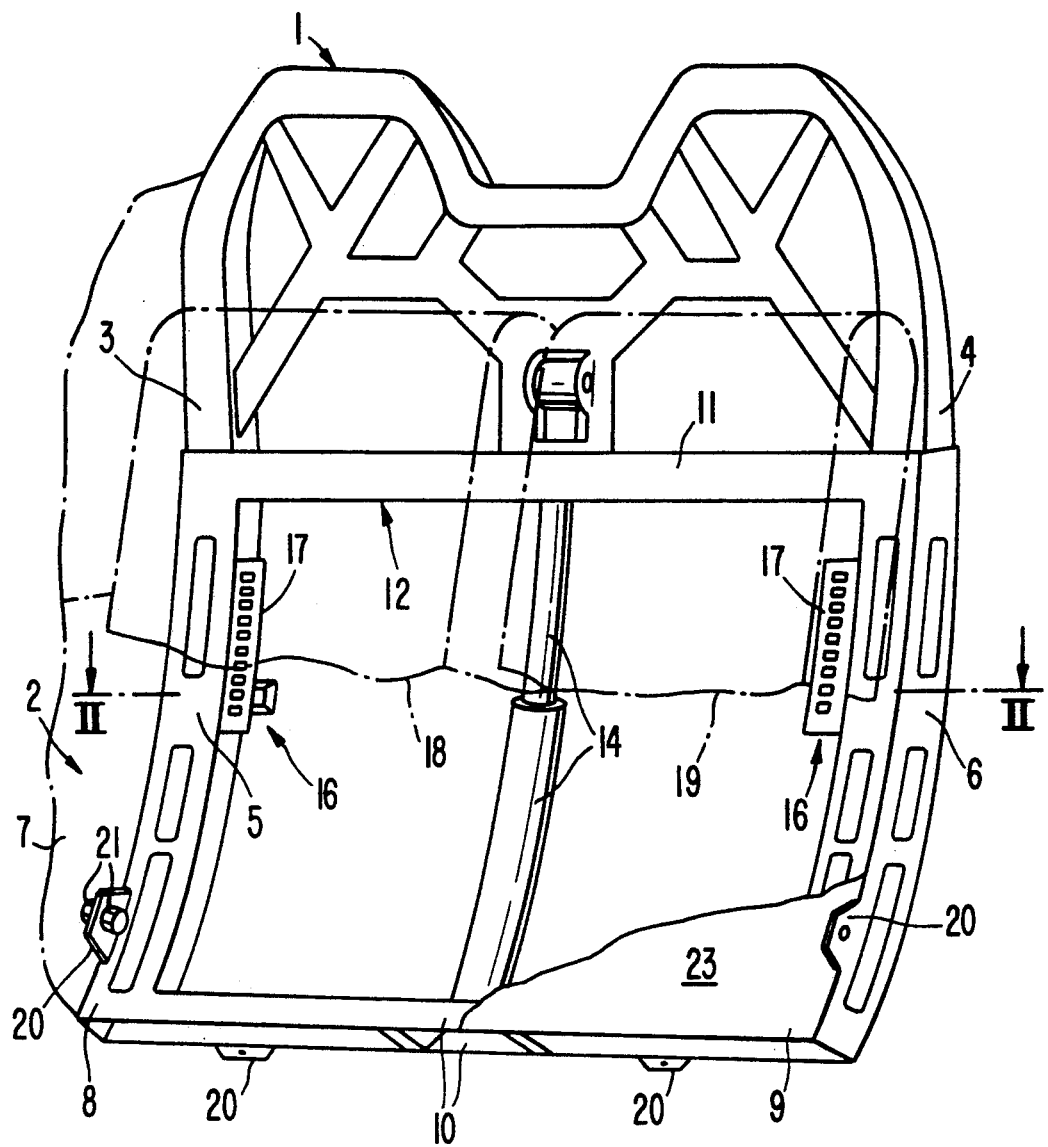
FIG. 1 is a schematic view which shows a roll bar together with its guide frame, constructed according to a preferred embodiment of the invention and disposed within a motor vehicle, a section of which is shown in dotted lines.

FIG. 1 shows a roll bar 1 in an only partly represented motor vehicle 2, which roll bar is configured in a U-shape and is guided with its two side arms 4, within respective holding tubes 5, 6. The holding tubes 5, 6, rising vertically parallel to the vehicle sides of a vehicle body 7 and parallel to one another, are secured to the body 7 and enable a vertical displacement of the roll bar 1 in order to protect the vehicle occupants if the vehicle 2 should overturn. The holding tubes 5, 6 are firmly connected to one another at their tube stems 8, 9 by a connecting element 10, which is here formed by connecting panels molded in a single piece with the holding tubes 5, 6. In addition to this lowly situated connecting element 10, the holding tubes 5, 6 are also firmly connected to one another, at their upper ends, by a connecting element 11 in the form of sheet-metal strips which are molded together with these tubes, with the result that the holding tubes 5, 6 and the two connecting elements 10, 11 produce a rectangularly closed, rigid guide frame 12, which is disposed in the transverse direction of the vehicle within the motor vehicle 2. This rigid guide frame 12 prevents the holding tubes 5, 6 in the event of distortion of the vehicle body 7, from being moved out of their alignment with one another and with the side arms 3, 4 of the roll bar 1. Thus, any upward travel of the side arms 3, 4 of the roll bar 1, guided through the T-shaped pilots 13 on the insides of the holding tubes 5, 6, is possible at all times without hindrance.

Figure 2:
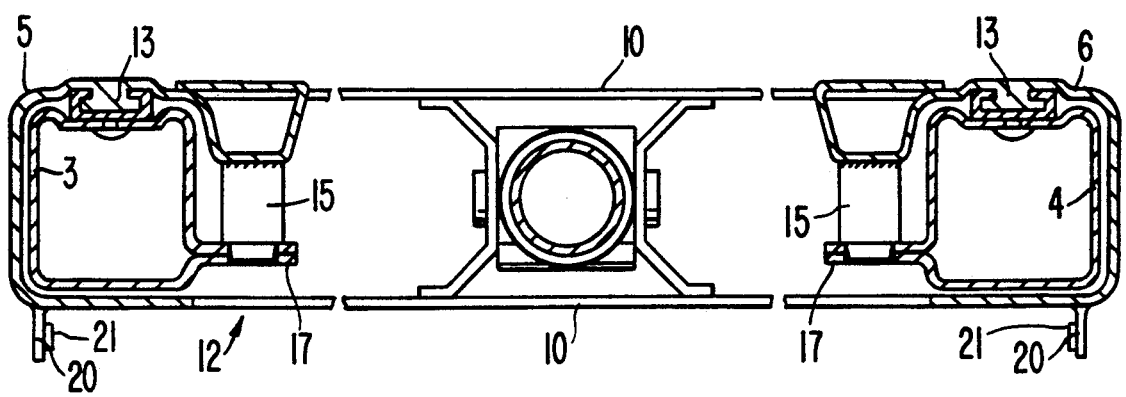
FIG. 2 shows an enlarged cross-section through the roll bar and with side walls revealed, along the line II—II of FIG. 1.

Additionally supported with one end on the guide frame 12 is a thrust element 14, which is configured as a spring-loaded piston-cylinder unit and which displaces the roll bar 1 in a controlled manner. Furthermore, the guide frame also holds a pawl 15, controllable in its movement, of a locking mechanism 16 for the roll bar 1, to which bar a notched rod 17 is secured, with which the pawl 15, securing the roll bar 1 against any movement, as can be more clearly seen in FIG. 2, is detachably engaged. The roll bar 1 in its guide frame 12 is complemented by these elements to form an assembly unit, which also makes the subsequent fitting of a roll bar 1 into a motor vehicle substantially easier.

The guide frame 12 can be provided, at least in sections, with two side walls, indicated by the member 23, which cover this rectangle and make the entire structure appear compact and, as a result of which, transportation and assembly are facilitated by this compact construction method.

This rigid guide frame 12 can now also be secured, at a chosen point along its circumference, to the body 7 and can thus also be supported on a body panel behind the vehicle seats 18, 19. The forces which occur when a vehicle overturns are absorbed by the guide frame 12 and transmitted to the vehicle body 7. On the guide frame 12 are provided connecting parts 20, by which the frame is bolted to the vehicle body 7, in each case a rubber buffer 21 acting between them, which buffer permits a limited movement of the guide frame 12 in the event of any distortion of the vehicle body 7.

Figure 2A:
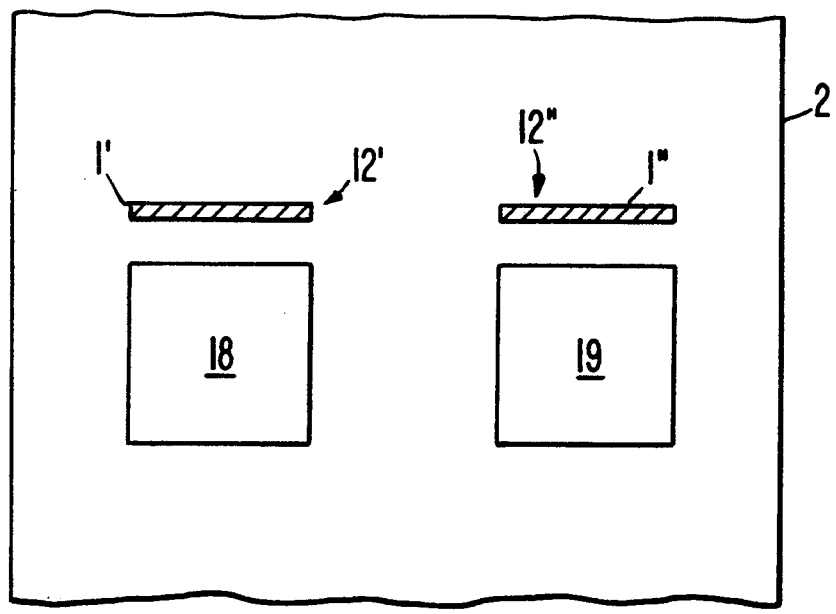
FIG. 2a shows a schematic overhead view of the vehicle wherein each seat is shown with a roll bar together with a guide frame constructed according to an exemplary embodiment of the invention.

Referring to FIG. 2a, a pair of guide frames 12', 12" of this type, each complete with a roll bar 1', 1" can also be provided individually for each vehicle seat 18, 19.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Vertically adjustable roll bar assembly for a motor vehicle, said roll bar assembly including a roll bar having side arms, hollow holding tubes rising vertically parallel to sides of the vehicle, the side arms being displaceable within the holding tubes, the holding tubes being connected to one another at opposite ends thereof by a pair of connecting elements on tube stems extending in the direction of the vehicle width, forming a rigid guide frame, the rigid guide frame being rectangularly closed in a transverse direction of the vehicle, and further including a thrust element and a locking mechanism for the roll bar which are secured to the guide frame in the form of an assembly unit and wherein this guide frame has connecting parts for connecting the guide frame to a vehicle body.

2. Vertically adjustable roll bar assembly according to claim 1, further including side walls attached to front and rear portions of the guide frame.

3. Vertically adjustable roll bar assembly according to claim 1, wherein the guide frame connecting part comprise connecting tabs attached thereto by which the guide frame can be bolted to a vehicle body.

4. Vertically adjustable roll bar assembly according to claim 1, wherein the guide frame is secured with a rubber mounting to a vehicle body.

5. Vertically adjustable roll bar assembly according to claim 1, wherein the roll bar complete with a guide frame is provided for only one vehicle seat.

6. Vertically adjustable roll bar assembly according to claim 2, wherein the guide frame connecting parts comprise connecting tabs attached thereto by which the guide frame can be bolted to a vehicle body.

7. Vertically adjustable roll bar assembly according to claim 6, wherein the guide frame is secured with a rubber mounting to a vehicle body.

* * * * *